United States Patent
Evans

[15] 3,655,975

[45] Apr. 11, 1972

[54] FILM BADGE RADIATION DOSIMETER FOR DETECTING RADON

[72] Inventor: Robley D. Evans, 15 Hickory Lane, Belmont, Mass. 02178

[22] Filed: Apr. 4, 1966

[21] Appl. No.: 539,691

[52] U.S. Cl..............................................250/83, 250/65
[51] Int. Cl..........................................................G01t 1/08
[58] Field of Search..........................250/83 PH, 83 CD, 65

[56] References Cited

UNITED STATES PATENTS

| | | | |
|---|---|---|---|
| 2,562,969 | 8/1951 | Teichmann | 250/83 X |
| 3,056,886 | 10/1962 | Glaude et al. | 250/83.6 X |

*Primary Examiner*—Archie R. Borchelt
*Attorney*—Rines and Rines

[57] ABSTRACT

The present invention relates to radiation detecting apparatus, being more particularly concerned with portable radiation indicating devices such as radon and radon daughter product film badges and other similar apparatus.

16 Claims, 3 Drawing Figures

PATENTED APR 11 1972
3,655,975
FIG. 1
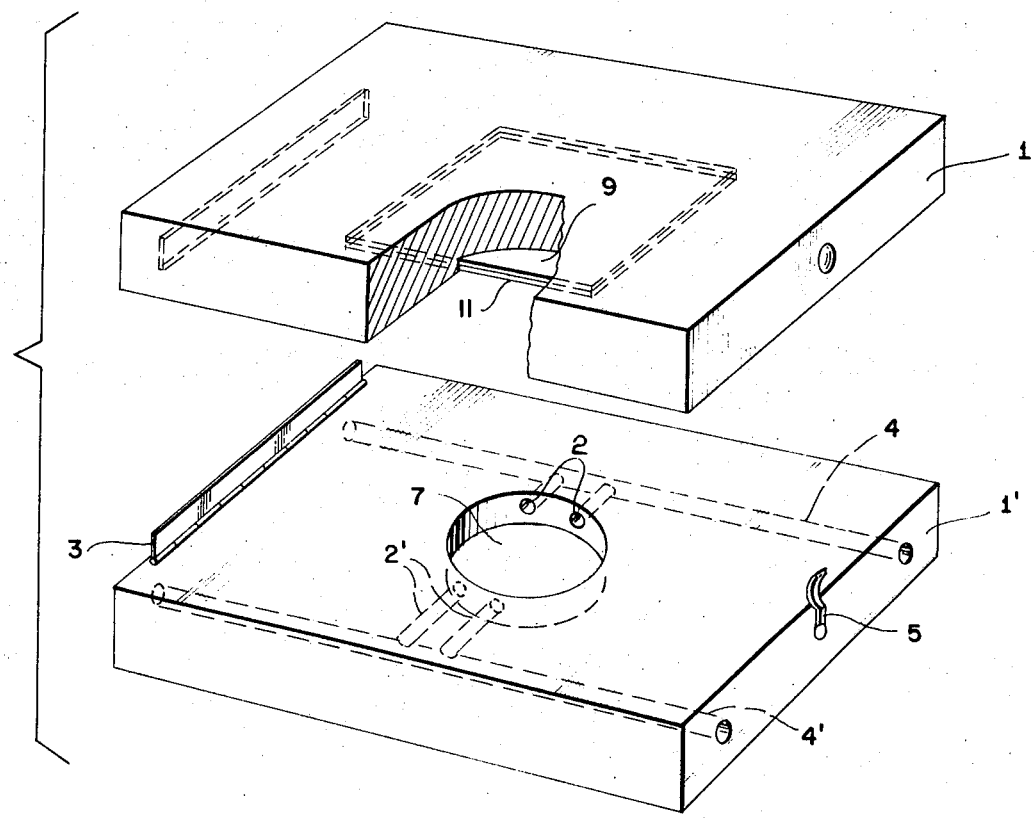
FIG. 2
FIG. 3
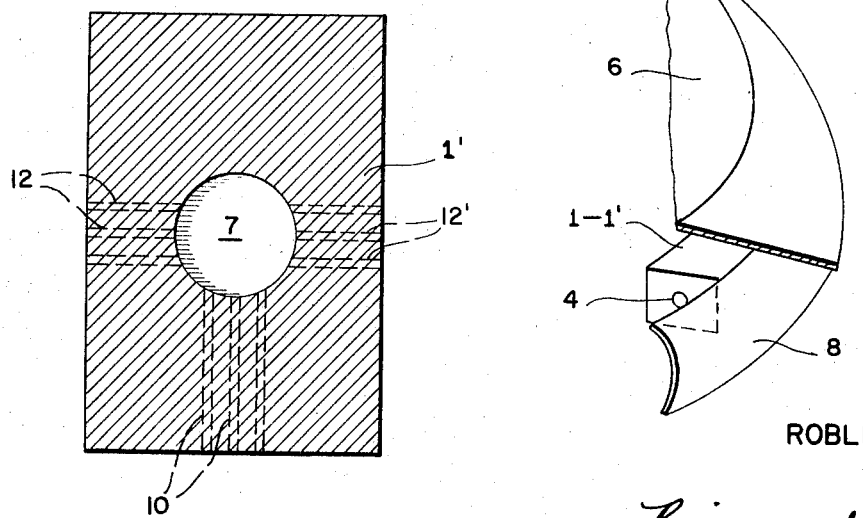
INVENTOR
ROBLEY D. EVANS
BY Rines and Rines
ATTORNEYS

FILM BADGE RADIATION DOSIMETER FOR DETECTING RADON

While numerous types of radiation detecting devices have been proposed and used throughout the years for such purposes as monitoring the dosage of radiation received by a worker over a period of time or detecting radiation levels at various locations, prior devices have required either power-operated systems, such as battery-operated detectors, or have been adapted, when of the passive type, to respond only to relatively large radiation levels. Among the passive types of devices are those that can respond to what are termed electromagnetic radiations, such as gamma and x-rays, as distinguished from alpha-particle radiation. Beta-ray film badges have also been employed as passive devices; but, again, are not adapted to respond to alpha-particle radiation, which is generally not only blocked by the layers and windows associated with beta, x or gamma ray equipment, but the characteristics of which are such that photographic films and other radiation responsive media adapted for such rays are substantially insensitive to alpha-particle radiation. In addition, there are many applications in which one wishes to detect alpha particles, as in uranium or other mining operations, where the level of alpha radiation is low and requires a highly sensitive type of radiation detector to integrate the exposure to such low level radiation over a period of time; say, for example, over a week or a month of mining operations or the like.

It is accordingly to the solution of the problems attendant upon the employment of a portable and preferably passive alpha particle or ray detector that the present invention is primarily directed; though it will be evident from the description hereinafter presented, that certain of the techniques and details of construction of the invention may also be useful for the detection of other types of radiation, as well.

A further object is to provide a new and improved radiation detecting badge or personal dosimeter.

Still a further object is to provide a novel radon and radon daughter product film badge that is particularly suited for use in the above-mentioned mining and similar applications.

Other and further objects will be explained hereinafter and will be more fully pointed out in connection with the appended claims. In summary, however, particularly in connection with the application of the invention to film badges, the invention preferably embodies a light-tight holder supporting within the same an alpha-sensitive film or other radiation-sensitive recording means that is adapted selectively to respond to alpha radiation while discriminating against light or other undesired types of radiation. The holder is provided with a plurality of passages extending in different directions that communicate the air or other medium external to the holder with an internal holder region containing such film or other radiation-sensitive recording means, thus to permit the passage of, for example, radon gas contained in the air, at least laterally into the region of the film. The film or other radiation-sensitive recording means may then become exposed or otherwise affected by the radiation to provide a measure of the exposure of the user of the holder to radon and radon daughter products in the atmosphere in which the user has been working. While the invention is described in connection with, for example, the radon gas that may be present in the air or other surrounding medium, it is evident that other alpha-emitting media in the air, including thoron and thoron daughter products, will also similarly be detected. Preferred details of construction are hereinafter set forth.

The invention will now be described with reference to the accompanying drawings, FIG. 1 of which is an isometric view of a preferred radiation detecting passive badge embodying features that are particularly well suited to the alpha-particle detection problem above mentioned, the view being exploded to illustrate details of construction;

FIG. 2 is a fragmentary isometric view of the holder of FIG. 1 in a mining use; and FIG. 3 is a top elevation of a modified bottom portion of the holder.

Referring to the drawing, a preferred radiation detecting badge is shown in FIG. 1 comprising a holder having an upper portion 1 shown separated from its lower portion 1', although in actual practice the two portions 1 and 1' may be hinged together at one end, as shown at 3, and secured as by a locking clip or other mechanism 5 at the other end. When thus locked together, the mated portions 1 and 1' form a substantially light-tight holder which may be clipped to the clothing or otherwise held, as later discussed in connection with the embodiment of FIG. 2. The lower portion 1' is shown provided with an intermediate recess or cavity 7, preferably (for purposes of symmetry) substantially centrally located, and into which may diffuse the air or other fluid medium external to the holder 1—1', through a plurality of small bore passages. The holder 1—1' is preferably formed of metal or electrically conducting plastic to prevent the setting up of charged fields that may affect the deposition of daughter products later described.

The recess 7 communicates with a pair of sets of diametrically opposite-direction bore passages 2—2' extending from its peripheral wall transversely in opposite lateral or cross directions from the recess 7. The sets of passages 2, 2' respectively intersect and communicate outwardly with a pair of main longitudinally extending passages or corridors 4 and 4' that, in FIG. 1, are shown extending completely between the left and right-hand end walls of the lower holder portion 1' on opposite sides of the recess 7. The external air or other fluid medium will move by diffusion and convection through the passages 4 and 4' and also into the cross-communicating transverse or lateral branch bore passages 2 and 2' to introduce a continually replenished sample of the external air exterior to the holder 1—1' within the recess 7. The cross-sectional dimensions of the passages are small compared with that of the sampling recess 7. In order to insure the passage through the recess 7 of a substantially constant volume of the external air or other medium per unit time, substantially independently of changes in fluid flow rate or gusts in the external area surrounding the holder 1—1', the above described symmetrical bridge passage construction with its transverse or cross branches 2 and 2' is employed instead of direct communication to the recess 7 from the main passages 4 and 4'. This feature is deemed most important for the purposes of the present invention since the quantity of radon daughter products or other alpha-emitting substances that may be present in some concentration in the air or other external fluid medium and which are delivered to and deposited in the recess 7 will be proportional to the rate of flow of the air or other medium into the recess 7 laterally through the bore passages 2 and 2'. Unless a substantially constant flow rate can be maintained, therefore, the quantity of alpha radiation, including daughter products produced by decay of the radon and otherwise, will not be a correct measure of the actual concentration of alpha particle emitters, the number of alpha particles, to the contrary, increasing when the rate of fluid flow increases, and decreasing when the fluid flow rate decreases.

A film or other radiation-sensing or recording means, later described, would not, thus, over a predetermined interval of time, provide a correct integrated result as to the concentration of alpha particle emitters, but, rather, would provide more intense results when the fluid flow rate increased and less intense results when it decreased. Through the above construction that enables controlling to a substantially constant degree the fluid flow rate into and out of the recess 7, therefore, it is insured that the effects produced by alpha radiation emanating from the recess 7 per unit time will reflect a substantially proportionate measure of the concentration of the radon gas (and especially its daughter products) and the like in the air or other external fluid medium over given intervals of time. Unlike the radon gas, which might readily flush in and out of the recess 7, many of the daughter products are particulate, and their concentration should not be erroneously varied with flow rate of the air or other external medium that is being sampled in the recess 7.

It now remains to explain how the alpha radiation present within the sampling recess 7 is detected. In accordance with the preferred embodiment of FIG. 1, the detector comprises a photographic film 9 supported by the upper holder portion 1 and having an emulsion that is selectively responsive to alpha particles, and to relatively low radiation levels of the same, as distinguished from emulsions that are suitable for beta, x, gamma and other undesired radiations, insofar as this particular detecting badge is concerned. Eastman Kodak Personal Neutron Monitoring Films Type A, Type NTA, and Ilford Type C2, for example, have been found suitable for this selective alpha detection purpose. It is important, however, that the response of such film or other recording medium 9 results from the alpha particle radiation and not from visible or other light rays that might leak into the holder or otherwise reach the film 9. Light, of course, does pass along the passages 4—4' and 2—2' into the sampling recess 7. To accomplish the rejection of light, a light-tight window 11 may be provided, secured over the film emulsion 9 to the periphery thereof and separating the same from direct communication with the recess 7; but sufficiently thin to permit substantially unimpeded passage of alpha particles from the recess 7 through the window 11 to the film 9. It has been found, for example, that a thin aluminized or other metalized Mylar sheet 11, of the order of magnitude of ¼ of a mil thick, more or less, can admirably serve these purposes in connection with passing alpha particles of even very low energy, say, 1 or 2 MeV. When the holder 1—1' is thus assembled in light-tight locked position, the film 9 will record the tracks of alpha particles resulting from the before-mentioned radon gas and daughter products or the like at the adjacent region of the sampling recess 7.

As a typical illustration, apparatus of the type shown in FIG. 1, having dimensions approximately 1 inch × 2 inches × ⅜ inch and bore passages 2, 2', 4, and 4' approximately 1/16 to ⅛ of an inch in diameter communicating with a sampling recess 7 of about ½ inch in diameter and about ⅛ of an inch deep, more or less, has been found to enable the detection with the above-described films of, for example, $10^{-10}$ curies of radon and daughter products per liter over a 40-hour period. Typical convective air flow rates of the order of several centimeters per second, more or less, may be produced in the sampling recess 7 and are maintained to a sufficient degree of constancy during operation in view of the above-described construction, providing the required substantially proportionate relationship between radiation effects produced on the film 9 and the concentration of alpha ray emitters in the sample at the recess 7 and thus determining the quantity of radon gas and radon daughters or other alpha radiation sources in the air or other external fluid medium surrounding the apparatus 1—1'.

In mining operations and the like, air, mud or other particulate contaminates, including moisture, may deleteriously affect this passive radiation badge, as by plugging the bore passages 4, 4', etc. A mechanism may be provided for shielding these passages from such effects, in use. Referring to FIG. 2, for example, a fragmentary view of the brim of a miner's hat 6 is shown, with the housing 1—1' clipped or otherwise maintained at the rear brim and provided with a preferably cylindrical shield 8 that protects the holder from the above-mentioned type of contaminants to a substantial degree. The shield 8, however, while extending beyond the edges of the holder 1—1' still permits the free flow of air into the passages 4—4'.

There are, moreover, other applications where the use of the radiation detector may not be subject to fluid flow variations such as occur when a miner steps into air compressor blasts or other unstable regions. As before explained, the preferably symmetrical arrangement of the passages of FIG. 1 enables such marked variations in fluid flow to occur along the main longitudinal passages 4—4' without substantially affecting the rate of flow along the transverse or cross bore passages 2—2' into the sampling recess 7. If, however, the apparatus 1—1' is to be employed in a region where there are no substantial fluctuations in flow of the air or other surrounding external medium, a plurality of separate bore passages, again extending in different directions and communicating the exterior of the holder with the sampling recess 7, may be employed in the embodiment of FIG. 3. In this modification, a plurality of longitudinal bore passages 10 communicate with the sampling recess 7 and a plurality of oppositely directed sets of transverse bore passages 12 and 12' communicate with the opposite side walls of the lower portion 1' of the holder, enabling adequate convection and diffusion of the air or other external fluid medium within the recess 7 but, as before stated, not compensating for marked variations in external fluid flow rate, as in the system in FIG. 1.

While the invention has been described in connection with its preferred application to alpha-particle detection, it is to be understood that, through the appropriate use of suitable recording media 9, this type of holder may also be advantageously used for the passive detection of other types of radiation. In addition, recording media other than sheets of photographic films 9 may be employed, including recording means that selectively respond to the desired radiation and discriminate against light or other types of undesired radiation. Further modifications may also occur to those skilled in the art, and all such are considered to fall within the spirit and scope of the present invention as defined in the appended claims.

What is claimed is:

1. A radiation detecting apparatus having, in combination, a support having radiation-sensitive recording means adapted selectively to respond to radiation in a region adjacent to the recording means while discriminating against light and other undesired types of radiation, passage means extending laterally outward therefrom in a plurality of directions for permitting the passage of a sample of an external fluid medium carrying a source of said radiation into the said region to produce a recording effect upon the recording means, thereby enabling a measure of the said radiation.

2. A radiation detecting badge having, in combination, a light-tight holder intermediately provided with a recess communicating with a plurality of small bore passages extending outward from the recess in a plurality of directions to the exterior of the holder, radiation-sensitive recording means positioned within the holder and adapted selectively to respond to radiation particles from the recess while discriminating against light and other undesired types of radiation, the radiation particles being emitted from a fluid medium carried by diffusion and convection through said bore passages into the recess to produce a recording effect upon the recording means, thereby enabling a measure of the exposure to said radiation.

3. A radon and radon daughter product film badge having, in combination, a light-tight holder intermediately provided with a recess communicating with a plurality of small bore passages extending outward from the recess in a plurality of directions to the exterior of the holder, a sheet of alpha-sensitive film positioned within the holder and separated from the said recess by a light-tight window sufficiently thin to permit substantially unimpeded passage of alpha particles from the recess through the window to the film, the alpha emission resulting from the radon gas and the like which has been carried by diffusion and convection through the said bore passages into the recess to produce tracks upon said film, thereby enabling a measure of the exposure to said gas.

4. Apparatus as claimed in claim 3 and in which the said light-tight window comprises a metalized Mylar sheet covering the film.

5. Apparatus as claimed in claim 3 and in which the passages comprise a first set extending longitudinally of the holder between its ends and a second set communicating transversely between the first set and the recess.

6. Apparatus as claimed in claim 5 and in which the passages are provided in one portion of the holder and the film and window in a mating portion.

7. Apparatus as claimed in claim 5 and in which the first set comprises passages disposed on opposite sides of the recess, and the second set comprises a pair of transverse passages communicating opposite sides of the recess with the separate passages of the first set.

8. Apparatus as claimed in claim 5 and in which the passages are of the order of substantially 1/16 to ⅛ inch and the recess is substantially cylindrical with a diameter of the order of substantially ½ inch.

9. Apparatus as claimed in claim 3 and in which the passages are disposed to provide a substantially constant flow rate through the recess.

10. Apparatus as claimed in claim 3 and in which shield means is provided to shield the holder from contaminating products, while permitting free flow through said passages.

11. Apparatus as claimed in claim 3 and in which the passage means comprises a plurality of longitudinally extending passages and a plurality of transverse passages respectively communicating end and side walls of the holder with said recess.

12. A dosimeter for radon and radon daughters of a size adapted to be worn on the person, comprising a flat base having a recess in its central portion, a multiplicity of small bores extending outwardly from the periphery of the recess in a plurality of directions to the exterior of the base, whereby circulation of air into and out of said recess is facilitated, a light-tight window mounted above the recess, said window being opaque to visible light and sufficiently thin to permit substantially unimpeded passage of alpha particles, and a removable cover over the window on the side opposite said recess and mounted to define a space for a sheet of film containing an alpha-sensitive emulsion capable of producing permanent visible indications of the presence and the number of alpha particles striking the film.

13. The invention of claim 12, said cover being pivotally mounted at one end and having latching means at the other.

14. A radon and radon daughter product film badge having, in combination, a light-tight holder intermediately provided with a space communicating at its sides with the exterior of the holder, alpha-sensitine detecting means positioned within the holder and separated from the said space by a light-tight window sufficiently thin to permit substantially unimpeded passage of alpha particles from the space through the window to the detecting means, the alpha emission resulting from the radon gas and the like which has been carried at the said sides into the space producing tracks upon said detecting means, thereby enabling a measure of the exposure to said gas.

15. Apparatus as claimed in claim 14 and in which means is provided for producing a substantially constant flow rate through the said space.

16. A radon and radon daughter product film badge having, in combination, a holder intermediately provided with a space communicating at its sides with the exterior of the holder, alpha-sensitive detecting means positioned within the holder and over said space to permit substantially unimpeded passage of alpha particles from the space to the detecting means, the alpha emission resulting from the radon gas and the like which has been carried at the said sides into the space producing tracks upon said detecting means, thereby enabling a measure of the exposure to said gas, and means for providing a substantially constant flow rate through the said space.

* * * * *